US009800604B2

(12) United States Patent
Knapp et al.

(10) Patent No.: US 9,800,604 B2
(45) Date of Patent: Oct. 24, 2017

(54) APPARATUS AND METHOD FOR ASSIGNING CYBER-SECURITY RISK CONSEQUENCES IN INDUSTRIAL PROCESS CONTROL ENVIRONMENTS

(71) Applicant: Honeywell International Inc., Morristown, NJ (US)

(72) Inventors: Eric D. Knapp, Milton, NH (US); Sinclair Koelemij, Velsen-Zuid (NL)

(73) Assignee: Honeywell International Inc., Morris Plains, NJ (US)

( * ) Notice: Subject to any disclaimer, the term of this patent is extended or adjusted under 35 U.S.C. 154(b) by 208 days.

(21) Appl. No.: 14/705,379

(22) Filed: May 6, 2015

(65) Prior Publication Data

US 2016/0330228 A1    Nov. 10, 2016

(51) Int. Cl.
| | |
|---|---|
| *G06F 11/00* | (2006.01) |
| *H04L 29/06* | (2006.01) |
| *G06F 3/0484* | (2013.01) |
| *G06F 3/0481* | (2013.01) |
| *G06F 21/57* | (2013.01) |

(52) U.S. Cl.
CPC ...... *H04L 63/1433* (2013.01); *G06F 3/04817* (2013.01); *G06F 3/04842* (2013.01); *G06F 21/57* (2013.01)

(58) Field of Classification Search
CPC ............ H04L 63/1433; H04L 63/1416; H04L 63/1425; H04L 63/1441; H04L 63/145; G06F 21/55; G06F 21/56; G06F 21/57; G06F 21/577; G06F 3/04817; G06F 3/04842

USPC ............ 726/11, 14, 22–26; 713/150; 709/223–225

See application file for complete search history.

(56) References Cited

U.S. PATENT DOCUMENTS

| | | | |
|---|---|---|---|
| 6,266,773 | B1 | 7/2001 | Kisor et al. |
| 7,136,856 | B2 | 11/2006 | Birbo et al. |
| 7,152,105 | B2 | 12/2006 | McClure et al. |
| 7,415,503 | B2 | 8/2008 | Chernoguzov |
| 7,627,891 | B2 | 12/2009 | Williams et al. |

(Continued)

FOREIGN PATENT DOCUMENTS

| | | |
|---|---|---|
| JP | 2008-112284 | 5/2008 |
| KR | 10-2005-0068052 | 7/2005 |

(Continued)

OTHER PUBLICATIONS

Gerhards, R.; "The Syslog Protocol"; Network Working Group; Adiscon GmbH; Mar. 2009; 38 pages.

(Continued)

*Primary Examiner* — Hosuk Song

(57) ABSTRACT

A method includes identifying multiple devices or groups of devices in an industrial process control and automation system. The method also includes, for each device or group of devices, (i) obtaining impact values identifying potential effects of a failure or compromise of the device or group of devices due to one or more cyber-security risks and (ii) identifying a consequence value using the impact values. Multiple impact values associated with different categories of potential effects are obtained, and the consequence value identifies an overall effect of the failure or compromise of the device or group of devices.

21 Claims, 4 Drawing Sheets

(56) References Cited

U.S. PATENT DOCUMENTS

| | | | |
|---|---|---|---|
| 7,900,259 B2 | 3/2011 | Jeschke et al. | |
| 7,908,660 B2 | 3/2011 | Bahl | |
| 7,921,459 B2 | 4/2011 | Houston et al. | |
| 7,984,504 B2 | 7/2011 | Hernacki et al. | |
| 8,020,210 B2 | 9/2011 | Tippett et al. | |
| 8,087,087 B1 | 12/2011 | Oorschot et al. | |
| 8,141,155 B2 | 3/2012 | Jeschke et al. | |
| 8,392,995 B2 | 3/2013 | Williamson et al. | |
| 8,438,643 B2 | 5/2013 | Wiemer et al. | |
| 8,494,974 B2 | 7/2013 | Watters et al. | |
| 8,595,831 B2 * | 11/2013 | Skare | G05B 23/0267 434/118 |
| 8,595,844 B2 | 11/2013 | Bahl | |
| 8,621,637 B2 * | 12/2013 | Al-Harbi | H04L 63/1433 713/188 |
| 8,712,596 B2 * | 4/2014 | Scott | G06F 21/55 700/297 |
| 8,726,393 B2 * | 5/2014 | Macy | G06F 21/577 726/1 |
| 8,763,074 B2 | 6/2014 | Bechtel et al. | |
| 8,769,412 B2 * | 7/2014 | Gill | G06F 21/55 702/185 |
| 8,776,168 B1 | 7/2014 | Gibson et al. | |
| 8,806,632 B2 | 8/2014 | Stefanidakis et al. | |
| 8,856,936 B2 * | 10/2014 | Datta Ray | H04L 63/1433 726/25 |
| 9,166,999 B1 | 10/2015 | Kulkami et al. | |
| 9,373,267 B2 * | 6/2016 | Sadeh-Koniecpol | G09B 5/00 |
| 9,401,926 B1 | 7/2016 | Dubow et al. | |
| 2003/0126472 A1 | 7/2003 | Banzhof | |
| 2003/0154393 A1 | 8/2003 | Young | |
| 2004/0030531 A1 | 2/2004 | Miller et al. | |
| 2004/0193907 A1 | 9/2004 | Patanella | |
| 2005/0010821 A1 | 1/2005 | Cooper et al. | |
| 2005/0144480 A1 | 6/2005 | Kim et al. | |
| 2005/0193430 A1 | 9/2005 | Cohen et al. | |
| 2005/0283751 A1 | 12/2005 | Bassin et al. | |
| 2006/0010493 A1 | 1/2006 | Piesco et al. | |
| 2006/0085852 A1 | 4/2006 | Sima | |
| 2006/0101517 A1 | 5/2006 | Banzhof et al. | |
| 2006/0117388 A1 | 6/2006 | Nelson et al. | |
| 2006/0123482 A1 | 6/2006 | Aaron | |
| 2006/0126501 A1 | 6/2006 | Ramaswamy | |
| 2006/0174121 A1 | 8/2006 | Omae et al. | |
| 2006/0206941 A1 | 9/2006 | Collins | |
| 2006/0239645 A1 | 10/2006 | Curtner et al. | |
| 2007/0067846 A1 | 3/2007 | McFarlane et al. | |
| 2007/0094491 A1 | 4/2007 | Teo et al. | |
| 2007/0143851 A1 | 6/2007 | Nicodemus et al. | |
| 2007/0223398 A1 | 9/2007 | Luo et al. | |
| 2007/0226794 A1 | 9/2007 | Howcroft et al. | |
| 2007/0289008 A1 | 12/2007 | Andreev et al. | |
| 2008/0016339 A1 | 1/2008 | Shukla | |
| 2008/0047016 A1 | 2/2008 | Spoonamore | |
| 2008/0141377 A1 | 6/2008 | Dunagan et al. | |
| 2008/0172347 A1 | 7/2008 | Bernoth et al. | |
| 2008/0189788 A1 | 8/2008 | Bahl | |
| 2008/0209567 A1 | 8/2008 | Lockhart et al. | |
| 2008/0229420 A1 | 9/2008 | Jeschke et al. | |
| 2008/0235196 A1 | 9/2008 | Broussard et al. | |
| 2008/0262822 A1 | 10/2008 | Hardwick et al. | |
| 2009/0024663 A1 | 1/2009 | McGovern | |
| 2009/0121860 A1 | 5/2009 | Kimmel et al. | |
| 2009/0228316 A1 | 9/2009 | Foley et al. | |
| 2010/0121929 A1 | 5/2010 | Lin | |
| 2010/0125911 A1 | 5/2010 | Bhaskaran | |
| 2010/0125912 A1 | 5/2010 | Greenshpon et al. | |
| 2010/0242114 A1 | 9/2010 | Bunker et al. | |
| 2010/0318512 A1 | 12/2010 | Ludwig | |
| 2010/0324945 A1 | 12/2010 | Hessing | |
| 2011/0039237 A1 | 2/2011 | Skare | |
| 2011/0126111 A1 | 5/2011 | Gill et al. | |
| 2011/0162073 A1 | 6/2011 | Jeschke et al. | |
| 2011/0231412 A1 | 9/2011 | Kariv | |
| 2011/0288692 A1 | 11/2011 | Scott | |
| 2012/0011077 A1 | 1/2012 | Bhagat | |
| 2012/0011590 A1 | 1/2012 | Donovan | |
| 2012/0109834 A1 | 5/2012 | Bongiovanni et al. | |
| 2012/0180133 A1 | 7/2012 | Al-Harbi et al. | |
| 2012/0224057 A1 | 9/2012 | Gill et al. | |
| 2012/0255003 A1 | 10/2012 | Sallam | |
| 2012/0268269 A1 | 10/2012 | Doyle | |
| 2013/0031037 A1 | 1/2013 | Brandt et al. | |
| 2013/0067558 A1 | 3/2013 | Markham et al. | |
| 2013/0111275 A1 | 5/2013 | Ganesan et al. | |
| 2013/0160119 A1 | 6/2013 | Sartin et al. | |
| 2013/0174259 A1 | 7/2013 | Pearcy et al. | |
| 2013/0212685 A1 | 8/2013 | Kelley et al. | |
| 2013/0239177 A1 | 9/2013 | Sigurdson et al. | |
| 2013/0247207 A1 | 9/2013 | Hugard et al. | |
| 2013/0283336 A1 | 10/2013 | Macy et al. | |
| 2013/0298244 A1 | 11/2013 | Kumar et al. | |
| 2013/0326002 A1 | 12/2013 | Leuoth et al. | |
| 2013/0347107 A1 | 12/2013 | Williams et al. | |
| 2014/0007244 A1 | 1/2014 | Martin et al. | |
| 2014/0082738 A1 | 3/2014 | Bahl | |
| 2014/0130121 A1 | 5/2014 | Lin | |
| 2014/0137257 A1 | 5/2014 | Martinez et al. | |
| 2014/0165128 A1 | 6/2014 | Auvenshine et al. | |
| 2014/0215555 A1 | 7/2014 | Barton et al. | |
| 2014/0236668 A1 | 8/2014 | Young et al. | |
| 2014/0283083 A1 | 9/2014 | Gula et al. | |
| 2014/0289796 A1 | 9/2014 | Moloian et al. | |
| 2014/0297495 A1 | 10/2014 | Dalal et al. | |
| 2014/0305525 A1 | 10/2014 | Le Moing et al. | |
| 2014/0337086 A1 | 11/2014 | Asenjo et al. | |
| 2014/0359777 A1 | 12/2014 | Lam et al. | |
| 2015/0018984 A1 | 1/2015 | Williams et al. | |
| 2015/0032839 A1 | 1/2015 | Serokurov et al. | |
| 2015/0033323 A1 | 1/2015 | Oliphant et al. | |
| 2015/0033337 A1 | 1/2015 | Baikalov et al. | |
| 2015/0163242 A1 | 6/2015 | Laidlaw et al. | |
| 2015/0213369 A1 | 7/2015 | Brandt et al. | |
| 2015/0242769 A1 | 8/2015 | Kezeu | |
| 2015/0264061 A1 | 9/2015 | Ibatullin et al. | |
| 2015/0281287 A1 | 10/2015 | Gill et al. | |
| 2015/0370983 A1 | 12/2015 | Vial et al. | |
| 2016/0011921 A1 | 1/2016 | Rao et al. | |
| 2016/0164892 A1 | 6/2016 | Satish et al. | |
| 2016/0205126 A1 | 7/2016 | Boyer et al. | |
| 2016/0205143 A1 | 7/2016 | Bryson et al. | |
| 2016/0212165 A1 | 7/2016 | Singla et al. | |
| 2016/0217160 A1 | 7/2016 | Croft | |
| 2016/0330222 A1 | 11/2016 | Brandt et al. | |

FOREIGN PATENT DOCUMENTS

| | | |
|---|---|---|
| KR | 10-1060277 | 8/2011 |
| KR | 10-2014-0097691 | 8/2014 |
| WO | WO 2013/166126 A1 | 11/2013 |

OTHER PUBLICATIONS

Knapp, E.D.; "Security Intelligence and Analytics in Industrial Systems"; Honeywell Users Group Europe, Middle East and Africa; 2014; 29 pages.

Koelemij, E.D.; "Effective Defense in Depth Strategies for Industrial Control Systems"; Honeywell Users Group Europe, Middle East and Africa; 2014; 21 pages.

Koelemij, S.; "Designing a Secure Industrial Control System"; Honeywell Users Group EMEA; Industrial IT Solutions: 2013; 11 pages.

Koelemij, S.; "Making Cyber Security S.M.A.R.T."; Honeywell Industrial Cyber Security; EMEA HUG Training Session; 2014; 63 pages.

Ricks, B.; "System Center 2012 R2 Operations Manager Documentation"; Microsoft System Center 2012 R2; Microsoft Corp; Nov. 1, 2013; 1389 pages.

Spear, M.; "Industrial Cyber Security 101"; Honeywell Users Group Europe, Middle East and Africa; 2015; 25 pages.

(56) References Cited

OTHER PUBLICATIONS

"Certification Testing Specification"; OPC Foundation; Release Candidate 1.02; May 28, 2014; 20 pages.
"Guide for Conducting Risk Assessments—Information Security"; NIST Special Publication 800-30, Revision 1; NIST, U.S. Dept of Commerce; Sep. 2012; 95 pages.
"Honeywell Industrial Cyber Security Overview and Managed Industrial Cyber Security Services"; HPS; Jun. 4, 2014; 19 pages.
"Information Technology—Security Techniques—Information Security Risk Management"; Bio Standards Publication; BS ISO/IEC 27005;2011; 80 pages.
"Risk Management and Critical Infrastructure Protection: Assessing, Integrating, and Managing Threats, Vulnerabilities and Consequences"; CRS Rpt for Congress; R132561; Feb 4, 2005; 28 pages.
"Security for Industrial Automation and Control Systems Part 2-3: Patch Management in the IACS Environment"; ISA-TR62443-2-3-2015; Jul. 1, 2015; 18 pages.
"Design and Planning Guide for System Center 2012—Operations Manager"; System Center 2012; Microsoft Corporation; Apr. 2012; 13 pages.
Notification of Transmittal of International Search Report and the Written Opinion of the International Searching Authority, or the Declaration dated Jun. 3, 2016 in connection with International Application No. PCT/US2016/016798, 10 pages.
Notification of Transmittal of International Search Report and the Written Opinion of the International Searching Authority, or the Declaration dated May 13, 2016 in connection with International Application No. PCT/US2016/015890, 11 pages.
Notification of Transmittal of International Search Report and the Written Opinion of the International Searching Authority, or the Declaration dated May 13, 2016 in connection with International Application No. PCT/US2016/016098, 12 page.
Notification of Transmittal of International Search Report and the Written Opinion of the International Searching Authority, or the Declaration dated Jun. 13, 2016 in connection with International Application No. PCT/US2016/016496, 12 pages.
Notification of Transmittal of International Search Report and the Written Opinion of the International Searching Authority, or the Declaration dated Jun. 3, 2016 in connection with International Application No. PCT/US2016/016399, 11 pages.
Notification of Transmittal of International Search Report and the Written Opinion of the International Searching Authority, or the Declaration dated Jun. 3, 2016 in connection with International Application No. PCT/US2016/016265, 10 pages.
Notification of Transmittal of International Search Report and the Written Opinion of the International Searching Authority, or the Declaration dated Jun. 2, 2016 in connection with International Application No. PCT/US2016/015952, 11 pages.
Notification of Transmittal of International Search Report and the Written Opinion of the International Searching Authority, or the Declaration dated May 18, 2016 in connection with International Application No. PCT/US2016/016159, 11 pages.
Hutzler, D., "How to Prevent Attacks on Air Gapped Networks," OPSWAT Blog, https://www.opswat.com/blog/how-prevent-attacks-air-gapped-networks, Jan. 16, 2015, 5 pages.
Marshall, R., "Guest Post: How to Configure Alerts in System Center 2012," https://blogs.technet.microsoft.com/uktechnet/2013/04/08/guest-post-how-to-configure-alerts-in-system-center-2012/, Apr. 3, 2013, 9 pages.
"Symantec™ Control Compliance Suite 11.0 User Guide," Symantec Corporation, https://www.scribd.com/document/126556709/CCS-User-Guide; 2012, 952 pages.
"Configuring Symantec Vulnerability Assessment 1.0 for Network Audits," TECH111985, https://support.symantec.com/en_US/article.TECH111985.html, Jan. 16, 2003, 6 pages.
"iPost: Implementing Continuous Risk Monitoring at the Department of State," Enterprise Network Management, U.S. Department of State, Information Resource Management Office of Information Assurance, Version 1.5, May 14, 2010, 28 pages.
U.S. Appl. No. 14/871,695, Non-Final Office Action dated Dec. 16, 2016, 56 pages.
U.S. Appl. No. 14/871,521, Non-Final Office Action dated Dec. 19, 2016, 11 pages.
U.S. Appl. No. 14/871,855, Non-Final Office Action dated Jan. 18, 2017, 12 pages.
U.S. Appl. No. 14/871,732, Non-Final Office Action dated Dec. 30, 2016, 36 pages.
U.S. Appl. No. 14/871,503, Non-Final Office Action dated Dec. 28, 2016, 11 pages.
U.S. Appl. No. 14/871,547, Non-Final Office Action dated Dec. 16, 2016, 12 pages.
U.S. Appl. No. 14/871,605, Non-Final Office Action dated Dec. 19, 2016, 13 pages.
U.S. Appl. No. 14/871,814, Non-Final Office Action dated Dec. 16, 2016, 7 pages.
U.S. Appl. No. 14/871,136, Non-Final Office Action dated Dec. 2, 2016, 18 pages.
Foreign Communication From a Related Counterpart Application, PCT Application No. PCT/US2016/028553, International Search Report and Written Opinion dated Aug. 1, 2016, 10 pages.

* cited by examiner

APPARATUS AND METHOD FOR ASSIGNING CYBER-SECURITY RISK CONSEQUENCES IN INDUSTRIAL PROCESS CONTROL ENVIRONMENTS

TECHNICAL FIELD

This disclosure relates generally to network security. More specifically, this disclosure relates to an apparatus and method for assigning cyber-security risk consequences in industrial process control environments.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility.

SUMMARY

This disclosure provides an apparatus and method for assigning cyber-security risk consequences in industrial process control environments.

In a first embodiment, a method includes identifying multiple devices or groups of devices in an industrial process control and automation system. The method also includes, for each device or group of devices, (i) obtaining impact values identifying potential effects of a failure or compromise of the device or group of devices due to one or more cyber-security risks and (ii) identifying a consequence value using the impact values. Multiple impact values associated with different categories of potential effects are obtained, and the consequence value identifies an overall effect of the failure or compromise of the device or group of devices.

In a second embodiment, an apparatus includes at least one processing device configured to identify multiple devices or groups of devices in an industrial process control and automation system. The at least one processing device is also configured, for each device or group of devices, to (i) obtain impact values identifying potential effects of a failure or compromise of the device or group of devices due to one or more cyber-security risks and (ii) identify a consequence value using the impact values. Multiple impact values associated with different categories of potential effects are obtained, and the consequence value identifies an overall effect of the failure or compromise of the device or group of devices.

In a third embodiment, a non-transitory computer readable medium embodies computer readable program code that when executed causes at least one processing device to identify multiple devices or groups of devices in an industrial process control and automation system. The computer readable medium also embodies computer readable program code that when executed causes the at least one processing device, for each device or group of devices, to (i) obtain impact values identifying potential effects of a failure or compromise of the device or group of devices due to one or more cyber-security risks and (ii) identify a consequence value using the impact values. Multiple impact values associated with different categories of potential effects are obtained, and the consequence value identifies an overall effect of the failure or compromise of the device or group of devices.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
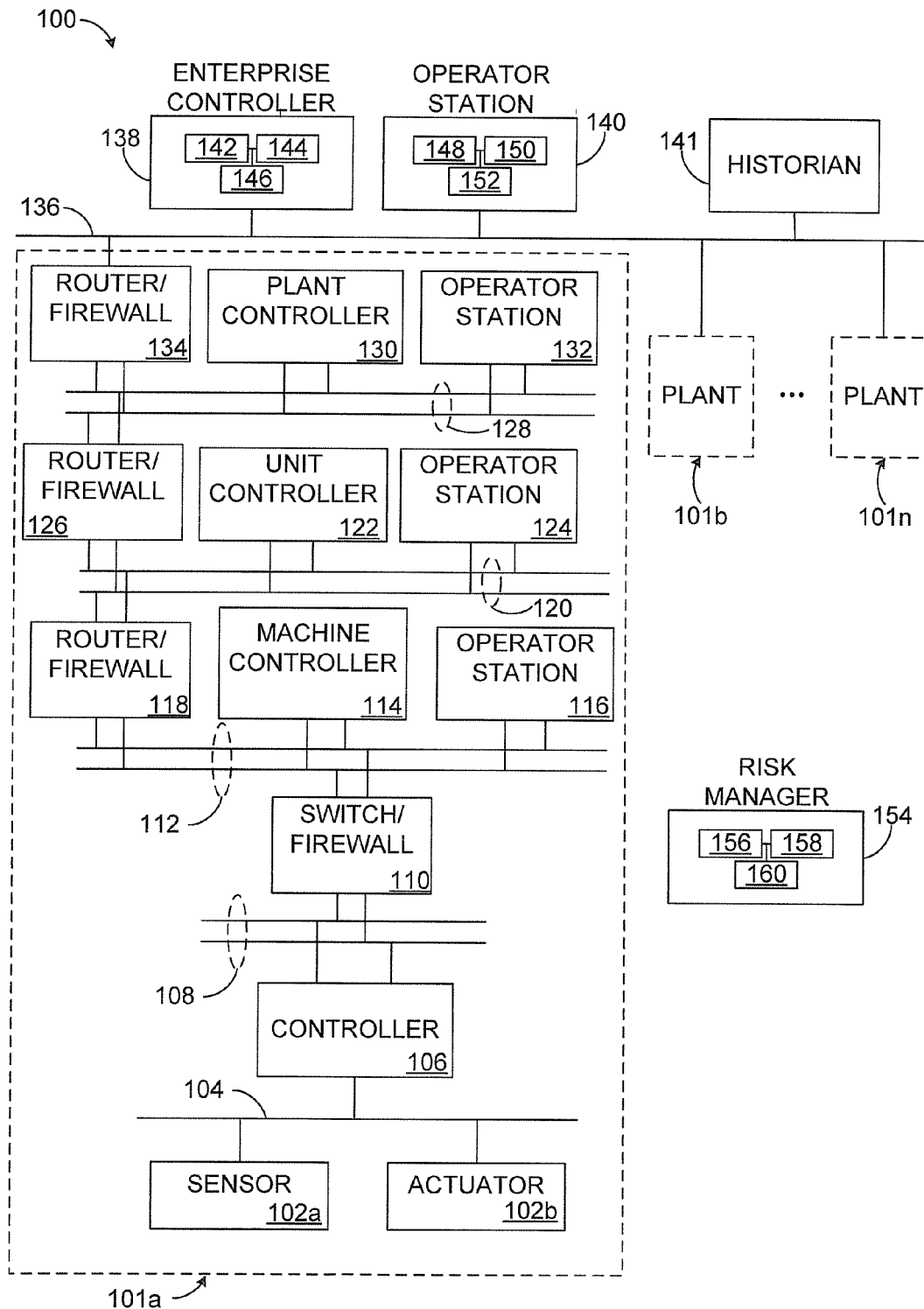
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server or other computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server or other computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/ firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server or other computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server or other computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. A cyber-security risk refers to a risk to at least one computing device, including the potential of illicit access, illicit change, or illicit damage to the computing device(s). Unaddressed security vulnerabilities in any of the components in the system 100 could be exploited by attackers to disrupt operations or cause unsafe conditions in an industrial facility. However, in many instances, operators do not have a complete understanding or inventory of all equipment running at a particular industrial site. As a result, it is often difficult to quickly determine potential sources of risk to a control and automation system.

In an industrial control and automation system, a tool or methodology could be used to assign a "risk score" to each cyber-security risk, and those risk scores could be used in various ways (such as to identify or prioritize the cyber-security risks in order to allow personnel to then reduce or eliminate those risks). Risk scores could be calculated as a function of threats, vulnerabilities, and consequences. Threats identify various types of cyber-security attacks that could be launched against an organization or its equipment, such as the installation of malware or the illicit control of processing equipment. Vulnerabilities identify weaknesses or other potential issues with networked equipment that could be exploited, such as missing or outdated antivirus software, misconfigured security settings, or weak or misconfigured firewalls. Consequences identify the types of effects or results that could be created if at least one of the threats materializes and exploits at least one of the vulnerabilities, such as physical damage to plant equipment.

In many instances, both threats and vulnerabilities are well-defined and generally consistent across and between organizations. For example, many organizations include computing devices that are vulnerable to the installation of malware or that could lack adequate antivirus software. However, consequences are often highly subjective and likely to introduce inconsistencies across and between organizations if configured arbitrarily. For instance, the consequence of a cyber-security threat materializing with one computer in one organization can be completely different from the consequence of the same cyber-security threat materializing with another computer in the same organization or with another computer in a different organization.

The lack of consistency in consequences can prevent accurate risk quantification. For example, in some instances, risk scores are generated to numerically or otherwise represent the significance of various cyber-security risks. Unfortunately, the lack of consistency in consequences can prevent risk scores from being accurately compared within and between different sites or organizations.

This disclosure provides a mechanism for identifying at least one consequence value of a cyber-security risk or incident against a specific target device or group of devices. A consequence value denotes a value that summarizes the overall effect or impact that could potentially occur as a result of a failure or compromise of the specific target device or group of devices. As a result, the consequence value can be derived from various potential impact(s) of the failure or compromise of the specific target device or group of devices.

This is accomplished using a risk manager 154. Among other things, the risk manager 154 supports a technique in which the risk manager 154 "interviews" an end user during a configuration process, such as via a user interface or a configuration wizard, to determine the potential impacts that the failure or compromise of one or more devices or groups of devices could have. As examples, the potential impact of the failure or compromise of a specific target device or group of devices could include no impact, minor impact, moderate impact, high impact, or critical impact. Moreover, the potential impacts could be broken down into different categories, such as (i) potential impact to health, safety, and the environment (HSE), (ii) potential impact to production of products or other materials, and (iii) potential impact to an organization. Using this information, the risk manager 154 could generate consequence values for different devices or groups of devices within the industrial control and automation system 100. By understanding both the independent consequence value of a device as well as the inter-connections and inter-relations of that device to other devices or groups within the industrial process control and automation system (as shown in FIG. 1), the risk manager 154 is able to utilize the device consequence values to determine accurate system-level consequence values and therefore accurate system-level risk scores. This allows more consistent consequence values to be generated, which (among other things) can help more consistent or more useful risk scores to be calculated and used.

Additional details regarding the operation of the risk manager 154 are provided below. The risk manager 154 includes any suitable structure that supports assigning cyber-security risk consequences in industrial process control environments. The functionality of the risk manager 154 could be implemented using any suitable hardware or a combination of hardware and software/firmware instructions. In this example, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

Figure 2:
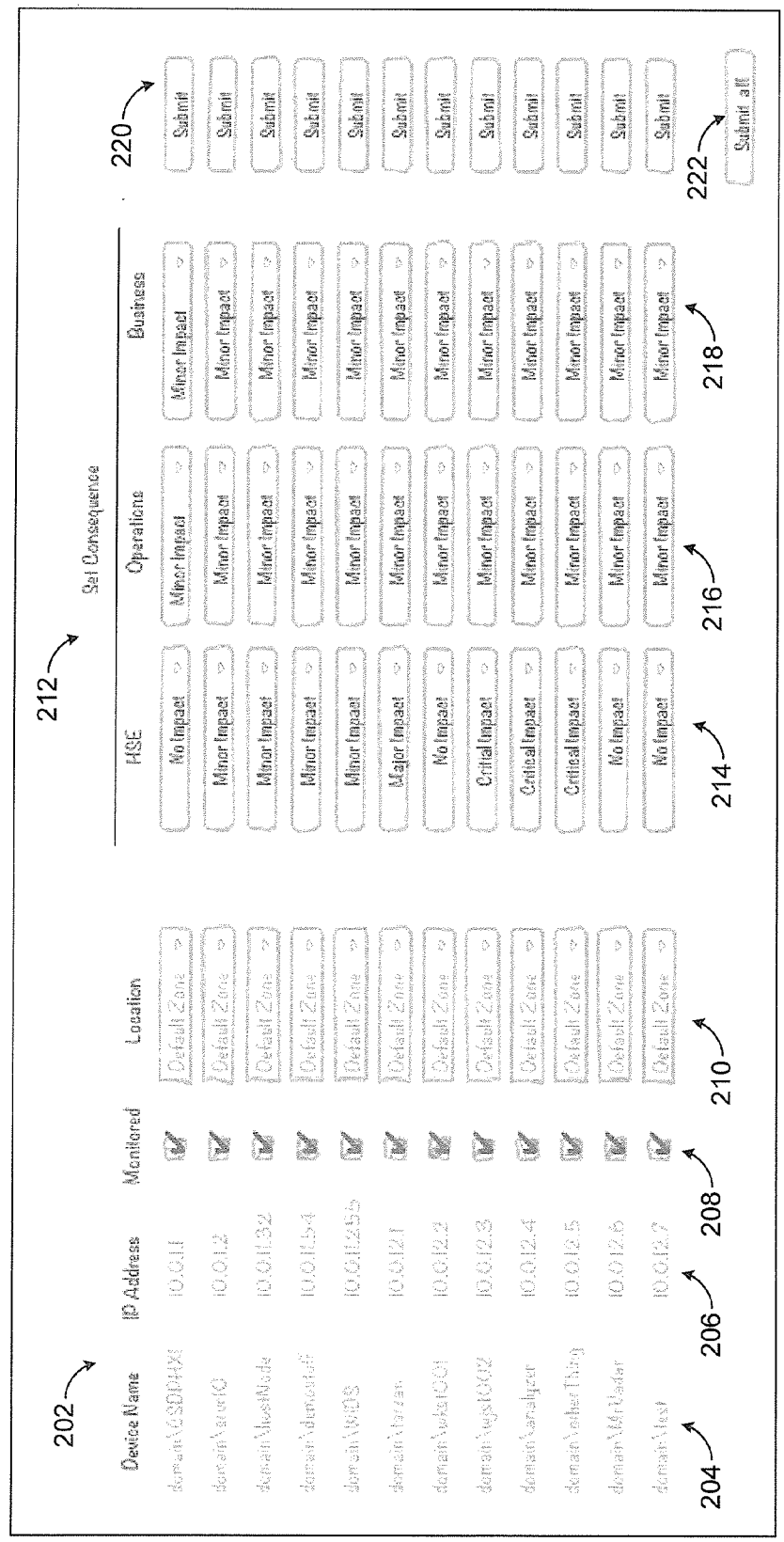
FIG. 2 illustrates an example graphical user interface for assigning cyber-security risk consequences according to this disclosure.

FIG. 2 illustrates an example graphical user interface 200 for assigning cyber-security risk consequences according to this disclosure. The graphical user interface 200 could, for example, be used by the risk manager 154 to obtain information from one or more end users in order to identify consequence values associated with cyber-security risks. Note, however, that the graphical user interface 200 could be used by any other suitable device and in any other suitable system.

As shown in FIG. 2, the graphical user interface 200 includes a list 202. In this example, the list 202 identifies networked devices within an industrial control and automation system. Note, however, that the list 202 could also identify groups of networked devices, such as different zones. A zone generally defines a collection of networked devices that can be monitored or controlled as a group, often where the networked devices are related in some way (such as by equipment type, geographic area, function, or other characteristics). The number of devices or groups contained in the list 202 in FIG. 2 is for illustration only and can vary depending on a number of factors, such as the system being managed or the area of the system previously selected by a user for monitoring or configuration. As a specific example, the devices or groups in the list 202 could be identified after an end user has selected a specific machine, unit, plant, or other subsection of a larger process system.

For each device or group in the list 202, the graphical user interface 200 presents various information about that device or group. In this example, the list 202 identifies for each device a name 204 of the device and a network address 206 (such as an Internet Protocol address) of the device. Each device is also associated with a checkbox 208, which controls whether the risk manager 154 is monitoring that device for cyber-security risks. Each device is further associated with a drop-down list 210 that allows the end user to group the devices into zones.

For each device or group in the list 202, the graphical user interface 200 also presents the end user with a set of consequence definition controls 212. The controls 212 include three drop-down lists 214-218 for each device or group in the list 202. The drop-down list 214 allows the end user to define the impact to health, safety, and the environment (HSE) if a specific device or group of devices failed or became compromised due to a cyber-security risk. The HSE consequences include a negative effect on the health or safety of individuals or on the surrounding environment. The drop-down list 216 allows the end user to define the impact to a production process if a specific device or group of devices failed or became compromised due to a cyber-security risk. The production consequences include a negative effect on any process performed by a system that involves producing or processing one or more materials in some manner. The drop-down list 218 allows the end user to define the impact to a business or other organization operating the system or the production process if a specific device or group of devices failed or became compromised due to a cyber-security risk. The organization consequences include a negative effect on the finances, independence, or other aspects of an organization.

In some embodiments, each drop-down list 214-218 could allow an end user to select one of the following options: no impact, minor impact, moderate impact, high impact, or critical impact. In the drop-down list 214 related to HSE impacts, these options could be defined as follows:
No impact: no or substantially minimal impact to widespread health, safety, and the environment;
Minor impact: minor injury or damage to the environment;
Moderate impact: major injury or damage to the environment;
High impact: loss of life or widespread environmental damage; and
Critical impact: widespread health and safety with catastrophic potential.

In the drop-down list 216 related to production impacts, these options could be defined as follows:
No impact: no or substantially minimal impact to production;
Minor impact: minor loss of production quality or volume;
Moderate impact: short-term loss of production quality or volume;
High impact: long-term loss of production quality or volume; and
Critical impact: unrecoverable failure or indefinite loss of production.

In the drop-down list 218 related to organizational impacts, these options could be defined as follows:
No impact: no or substantially minimal impact on regulations or governance;
Minor impact: minor non-compliance issues;
Moderate impact: non-compliance requiring additional action;
High impact: penalty associated with non-compliance; and
Critical impact: major penalty or consequence.

Each device or group in the list 202 has an associated "submit" button 220, which allows the end user to accept the settings for that specific device or group in the graphical user interface 200. Additionally or alternatively, a "submit all" button 222 allows the end user to accept the settings for all devices or group listed in the graphical user interface 200. Note that when settings are submitted for a group of devices (such as a zone), the settings defined in the graphical user interface 200 for that group can be applied to all devices in that group.

The impact values selected using the drop-down lists 214-218 could be used by the risk manager 154 (or other components of a control and automation system) in any suitable manner, and the understanding of the industrial process control and automation system can be used such that a given device consequence value can further weight the consequence value of other connected devices or groups of devices in any suitable manner. For example, the risk manager 154 could assign a numerical value to each impact value selected using the drop-down lists 214-218. As a particular example, "no impact" selections could be assigned a value of 20, "minor impact" selections could be assigned a value of 40, "moderate impact" selections could be assigned a value of 60, "high impact" selections could be assigned a value of 80, and "critical impact" selections could be assigned a value of 100. One or more of these numerical values could then be used by the risk manager 154 to calculate the "risk score" associated with each cyber-security risk to a device or group. As a particular example, the largest numerical value associated with the entries selected using the drop-down lists 214-218 for a device or group could be used as the consequence value during the calculation of a risk score for that device or group (where risk scores are calculated using numerical values representing threats, vulnerabilities, and consequences as noted above). Note that any suitable function can be used to calculate risk scores based on threats, vulnerabilities, and consequences. Also note that consequence values need not be numeric; any value summarizing the overall impact that could potentially occur as a result of a failure or compromise of a device or group of devices because of a cyber-security risk could be used.

Figure 3:
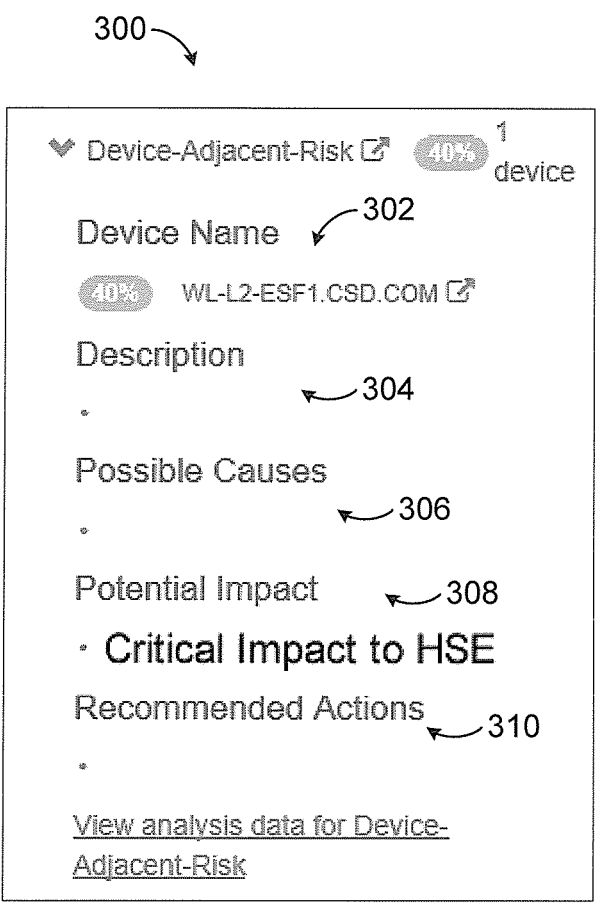
FIG. 3 illustrates an example graphical user interface for using assigned cyber-security risk consequences according to this disclosure.

As another example, after generating the cyber-security risk scores, those risk scores could be presented on a graphical display to one or more end users, such as end users responsible for maintaining security within the system 100. If a cyber-security risk is identified having a score above a threshold, that cyber-security risk can be flagged to the users, such as via a warning, alarm, or other notification. If a user chooses to view particular details of a notification, the impact(s) associated with that cyber-security risk could be included in the display. FIG. 3 illustrates an example graphical user interface 300 for using assigned cyber-security risk consequences according to this disclosure. The graphical user interface 300 here identifies a particular cyber-security risk to a particular device or group identified by name 302. The graphical user interface 300 also provides a description 304 of the cyber-security risk, one or more possible causes 306 of the cyber-security risk, one or more potential impacts 308 of the cyber-security risk, and one or more recommended actions 310 for resolving or reducing the cyber-security risk. The impact information provided using the drop-down lists 214-218 for a particular device or group can be included within or as part of the potential impacts 308 of the cyber-security risk. In FIG. 3, for instance, a particular cyber-security risk can have a critical impact on health, safety, or the environment. This type of information can be particularly useful to personnel responsible for maintaining or improving cyber-security within a site or across multiple sites, as it informs the personnel of the potential impact(s) if the cyber-security risk is not reduced or eliminated.

Although FIG. 2 illustrates one example of a graphical user interface 200 for assigning cyber-security risk consequences, various changes may be made to FIG. 2. For example, while certain input mechanisms (such as checkboxes and drop-down lists) are shown in FIG. 2, any other or additional input mechanisms could be used to obtain information from one or more users. Also, while three categories of impact values (HSE, production, and organization) are shown in FIG. 2, any other or additional categories of impact values could also be defined. Although FIG. 3 illustrates one example of a graphical user interface 300 for using assigned cyber-security risk consequences, various changes may be made to FIG. 3. For instance, the impact values obtained using the graphical user interface 200 of FIG. 2 could be used in any other suitable manner.

Figure 4:
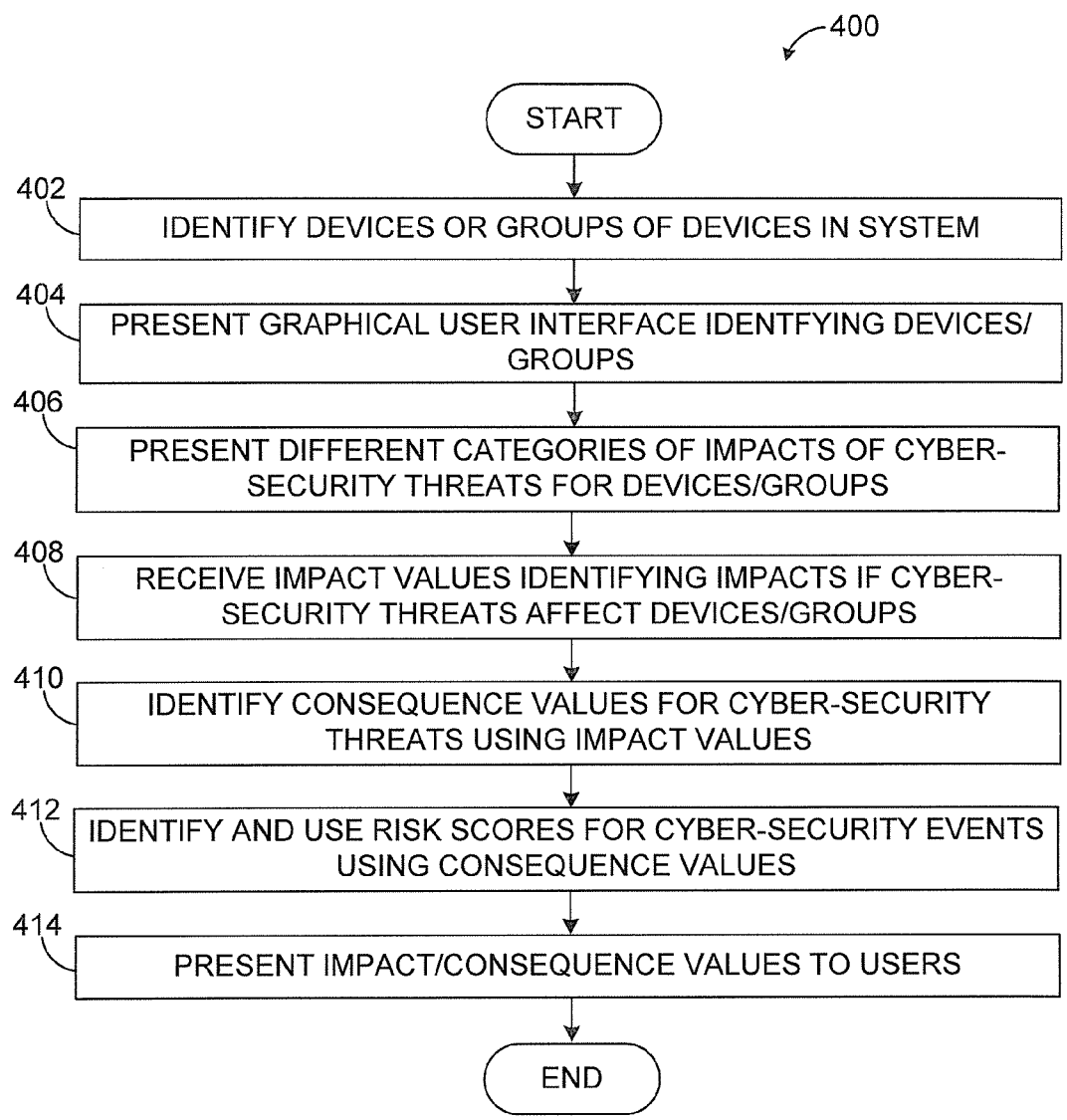
FIG. 4 illustrates an example method for assigning cyber-security risk consequences according to this disclosure.

FIG. 4 illustrates an example method 400 for assigning cyber-security risk consequences according to this disclosure. The method 400 could, for example, be used by the risk manager 154 to obtain information from one or more end users in order to identify consequence values associated with cyber-security risks. Note, however, that the method 400 could be used by any other suitable device and in any other suitable system.

As shown in FIG. 4, devices or groups of devices in an industrial control and automation system are identified at step 402. This could include, for example, the risk manager 154 receiving user input identifying a particular machine, unit, plant, or other portion of a process system or all of a process system. Various techniques are known for identifying devices or groups of devices in an industrial system, such as the use of a hierarchical device/zone tree or a graphical representation of an industrial system.

A graphical user interface identifying the devices or groups of devices is presented at step 404. This could include, for example, the risk manger 154 generating the graphical user interface 200 and presenting the graphical user interface 200 on a display. The graphical user interface 200 can include a listing 202 of the identified devices or groups of devices.

Different categories of impacts associated with cyber-security risks for the devices or groups are presented at step 406. This could include, for example, the risk manger 154 including the set of consequence definition controls 212 in the graphical user interface 200, where the consequence definition controls 212 identify different categories of impacts. Example categories of impacts can include HSE, production, and organizational impacts, although any other or additional impact categories could be identified. Also, the HSE, production, and organizational impacts could be subdivided into more specific categories, such as separate health, safety, and environment impact categories or different types of production or organizational impact categories.

Impact values identifying the potential impacts that may be experienced if at least one cyber-security threat materializes and exploits at least one cyber-security vulnerability of the devices or groups are received at step 408. This could include, for example, the risk manger 154 receiving user selections via the drop-down lists 214-218 in the definition controls 212 of the graphical user interface 200. An impact value can be received for each impact category for each device or group identified in the graphical user interface 200. Note that default impact values, such as "no impact" values, could pre-populate the drop-down lists 214-218 so that the user only needs to make selections for devices or groups where cyber-security events would have some type of impact.

The impact values can be used in any suitable manner. For example, in FIG. 4, consequence values for cyber-security threats can be identified using the impact values at step 410, and risk scores for the cyber-security threats can be identified using the consequence values at step 412. This could include, for example, the risk manager 154 mapping each impact value to a numerical value, such as by mapping values of 20, 40, 60, 80, and 100 to "no impact," "minor impact," "moderate impact," "high impact," and "critical impact" values, respectively. This could also include the risk manager 154 identifying the largest numerical value assigned to any impact associated with each device or group, and that largest numerical value could be used as the consequence value for that device or group. The consequence value could then be used to calculate any risk scores for cyber-security threats associated with that device or group, and the risk scores could be used in any suitable manner, such as to generate another graphical user interface that identifies cyber-security risks associated with risk scores above one or more thresholds. As another example, the impact or consequence values can be presented to users, such as within other graphical user interfaces, at step 414. A particular example of this is shown in FIG. 3, where the graphical user interface 300 uses an impact value as part of the information describing a specific cyber-security risk. Note, however, that the impact or consequence values could be used in any other or additional manner.

Although FIG. 4 illustrates one example of a method 400 for assigning cyber-security risk consequences, various changes may be made to FIG. 4. For example, while shown as a series of steps, various steps in FIG. 4 could overlap, occur in parallel, occur in a different order, or occur any number of times.

Note that the risk manager 154 and/or the graphical user interface 200 could be used or operate in conjunction with any combination or all of various features described in the following previously-filed patent applications (all of which are hereby incorporated by reference):

- U.S. patent application Ser. No. 14/482,888 entitled "DYNAMIC QUANTIFICATION OF CYBER-SECURITY RISKS IN A CONTROL SYSTEM";
- U.S. Provisional Patent Application No. 62/036,920 entitled "ANALYZING CYBER-SECURITY RISKS IN AN INDUSTRIAL CONTROL ENVIRONMENT";
- U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES";
- U.S. Provisional Patent Application No. 62/113,221 entitled "NOTIFICATION SUBSYSTEM FOR GENERATING CONSOLIDATED, FILTERED, AND RELEVANT SECURITY RISK-BASED NOTIFICATIONS";
- U.S. Provisional Patent Application No. 62/113,100 entitled "TECHNIQUE FOR USING INFRASTRUCTURE MONITORING SOFTWARE TO COLLECT CYBER-SECURITY RISK DATA";
- U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA";
- U.S. Provisional Patent Application No. 62/113,165 entitled "PATCH MONITORING AND ANALYSIS";
- U.S. Provisional Patent Application No. 62/113,152 entitled "APPARATUS AND METHOD FOR AUTOMATIC HANDLING OF CYBER-SECURITY RISK EVENTS";
- U.S. Provisional Patent Application 62/114,928 entitled "APPARATUS AND METHOD FOR DYNAMIC CUSTOMIZATION OF CYBER-SECURITY RISK ITEM RULES";
- U.S. Provisional Patent Application 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS"; and U.S. Provisional Patent Application 62/114,937 entitled "APPARATUS AND METHOD FOR TYING CYBER-SECURITY RISK ANALYSIS TO COMMON RISK METHODOLOGIES AND RISK LEVELS".

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying multiple devices or groups of devices in an industrial process control and automation system;
   for each device or group of devices:
      obtaining impact values identifying potential effects of a failure or compromise of the device or group of devices due to one or more cyber-security risks, wherein multiple impact values associated with different categories of potential effects are obtained; and
      identifying a consequence value using the impact values, the consequence value identifying an overall effect of the failure or compromise of the device or group of devices; and
   using the consequence value for a first of the devices or groups of devices to modify the consequence value for a second of the devices or groups of devices based on a process control connection between the first and second devices or groups of devices.

2. The method of claim 1, wherein the different categories of potential effects comprise:
   a category associated with impacts to health or safety of individuals or to an environment associated with the control and automation system;
   a category associated with a production process performed or managed by the control and automation system; and
   a category associated with an organization operating the control and automation system.

3. The method of claim 2, wherein each impact value comprises an identification of one of: no impact, a minor impact, a moderate impact, a high impact, and a critical impact.

4. The method of claim 1, wherein identifying the consequence value for one device or group of devices comprises:
   assigning a numerical value to each of the impact values obtained for the device or group of devices; and
   identifying a largest of the numerical values associated with the device or group of devices.

5. A method comprising:
   identifying multiple devices or groups of devices in an industrial process control and automation system; and
   for each device or group of devices:
      obtaining impact values identifying potential effects of a failure or compromise of the device or group of devices due to one or more cyber-security risks, wherein multiple impact values associated with different categories of potential effects are obtained;
      identifying a consequence value using the impact values, the consequence value identifying an overall effect of the failure or compromise of the device or group of devices; and
      calculating one or more risk scores associated with the device or group of devices, each risk score associated with at least one of the one or more cyber-security risks and calculated using the consequence value for the device or group of devices.

6. The method of claim 1, further comprising:
   generating a graphical user interface identifying details of at least one of the one or more cyber-security risks, the details identifying at least one of the potential effects associated with at least one of the devices or groups of devices.

7. The method of claim 1, wherein obtaining the impact values comprises:
   presenting a graphical user interface comprising a list of the devices or groups of devices and inputs for each device or group of devices, the inputs configured to receive the impact values in the different categories.

8. The method of claim 5, further comprising:
   using the consequence value for a first of the devices or groups of devices to modify the consequence value for a second of the devices or groups of devices based on a process control connection between the first and second devices or groups of devices.

9. An apparatus comprising:
at least one processing device configured to:
identify multiple devices or groups of devices in an industrial process control and automation system;
for each device or group of devices:
obtain impact values identifying potential effects of a failure or compromise of the device or group of devices due to one or more cyber-security risks, wherein multiple impact values associated with different categories of potential effects are obtained; and
identify a consequence value using the impact values, the consequence value identifying an overall effect of the failure or compromise of the device or group of devices; and
use the consequence value for a first of the devices or groups of devices to modify the consequence value for a second of the devices or groups of devices based on a process control connection between the first and second devices or groups of devices.

10. The apparatus of claim 9, wherein the different categories of potential effects comprise:
a category associated with impacts to health or safety of individuals or to an environment associated with the control and automation system;
a category associated with a production process performed or managed by the control and automation system; and
a category associated with an organization operating the control and automation system.

11. The apparatus of claim 10, wherein each impact value comprises an identification of one of: no impact, a minor impact, a moderate impact, a high impact, and a critical impact.

12. The apparatus of claim 9, wherein, to identify the consequence value for one device or group of devices, the at least one processing device is configured to:
assign a numerical value to each of the impact values obtained for the device or group of devices; and
identify a largest of the numerical values associated with the device or group of devices.

13. The apparatus of claim 9, wherein the at least one processing device is further configured to:
generate a graphical user interface identifying details of at least one of the one or more cyber-security risks, the details identifying at least one of the potential effects associated with at least one of the devices or groups of devices.

14. The apparatus of claim 9, wherein, to obtain the impact values, the at least one processing device is configured to:
present a graphical user interface comprising a list of the devices or groups of devices and inputs for each device or group of devices, the inputs configured to receive the impact values in the different categories.

15. An apparatus comprising:
at least one processing device configured to:
identify multiple devices or groups of devices in an industrial process control and automation system; and
for each device or group of devices:
obtain impact values identifying potential effects of a failure or compromise of the device or group of devices due to one or more cyber-security risks, wherein multiple impact values associated with different categories of potential effects are obtained;
identify a consequence value using the impact values, the consequence value identifying an overall effect of the failure or compromise of the device or group of devices; and
calculate one or more risk scores associated with the device or group of devices, each risk score associated with at least one of the one or more cyber-security risks and calculated using the consequence value for the device or group of devices.

16. A non-transitory computer readable medium embodying computer readable program code that when executed causes at least one processing device to:
identify multiple devices or groups of devices in an industrial process control and automation system; and
for each device or group of devices:
obtain impact values identifying potential effects of a failure or compromise of the device or group of devices due to one or more cyber-security risks, wherein multiple impact values associated with different categories of potential effects are obtained;
identify a consequence value using the impact values, the consequence value identifying an overall effect of the failure or compromise of the device or group of devices; and
calculate one or more risk scores associated with the device or group of devices, each risk score associated with at least one of the one or more cyber-security risks and calculated using the consequence value for the device or group of devices.

17. The non-transitory computer readable medium of claim 16, wherein the different categories of potential effects comprise:
a category associated with impacts to health or safety of individuals or to an environment associated with the control and automation system;
a category associated with a production process performed or managed by the control and automation system; and
a category associated with an organization operating the control and automation system.

18. The non-transitory computer readable medium of claim 16, wherein the computer readable program code that when executed causes the at least one processing device to identify the consequence value for one device or group of devices comprises computer readable program code that when executed causes the at least one processing device to:
assign a numerical value to each of the impact values obtained for the device or group of devices; and
identify a largest of the numerical values associated with the device or group of devices.

19. The non-transitory computer readable medium of claim 16, wherein the computer program further comprises computer readable program code that when executed causes the at least one processing device to:
generate a graphical user interface identifying details of at least one of the one or more cyber-security risks, the details identifying at least one of the potential effects associated with at least one of the devices or groups of devices.

20. The non-transitory computer readable medium of claim 16, wherein the computer readable program code that when executed causes the at least one processing device to obtaining the impact values comprises computer readable program code that when executed causes the at least one processing device to:
present a graphical user interface comprising a list of the devices or groups of devices and inputs for each device or group of devices, the inputs configured to receive the impact values in the different categories.

21. A non-transitory computer readable medium embodying computer readable program code that when executed causes at least one processing device to:
- identify multiple devices or groups of devices in an industrial process control and automation system;
- for each device or group of devices:
  - obtain impact values identifying potential effects of a failure or compromise of the device or group of devices due to one or more cyber-security risks, wherein multiple impact values associated with different categories of potential effects are obtained; and
  - identify a consequence value using the impact values, the consequence value identifying an overall effect of the failure or compromise of the device or group of devices; and
- use the consequence value for a first of the devices or groups of devices to modify the consequence value for a second of the devices or groups of devices based on a process control connection between the first and second devices or groups of devices.

\* \* \* \* \*